(12) United States Patent
Jung (10) Patent No.: US 11,590,941 B2
(45) Date of Patent: Feb. 28, 2023

(54) DRIVER ASSISTANCE APPARATUS AND DRIVER ASSISTANCE METHOD

(71) Applicant: MANDO CORPORATION, Pyeongtaek-si (KR)

(72) Inventor: Soomyung Jung, Seoul (KR)

(73) Assignee: HL Klemove Corp., Incheon (KR)

( * ) Notice: Subject to any disclaimer, the term of this patent is extended or adjusted under 35 U.S.C. 154(b) by 169 days.

(21) Appl. No.: 17/124,784

(22) Filed: Dec. 17, 2020

(65) Prior Publication Data

US 2021/0188227 A1    Jun. 24, 2021

(30) Foreign Application Priority Data

Dec. 20, 2019 (KR) .................. 10-2019-0172392

(51) Int. Cl.
| B60T 7/22 | (2006.01) |
| G08G 1/16 | (2006.01) |
| B60T 8/171 | (2006.01) |
| B60T 8/172 | (2006.01) |

(52) U.S. Cl.
CPC .............. *B60T 7/22* (2013.01); *B60T 8/171* (2013.01); *B60T 8/172* (2013.01); *G08G 1/16* (2013.01); *B60T 2201/022* (2013.01); *B60T 2210/122* (2013.01); *B60T 2210/30* (2013.01); *B60T 2210/32* (2013.01)

(58) Field of Classification Search
CPC . B60T 7/22; B60T 8/171; B60T 8/172; B60T 2201/022; B60T 2210/122; B60T 2210/30; B60T 2210/32; G08G 1/16
See application file for complete search history.

(56) References Cited

U.S. PATENT DOCUMENTS

| 10,674,052 B1 * | 6/2020 | Stein ..................... H04N 5/2256 |
| 2018/0293446 A1 * | 10/2018 | Becker .................. B60W 40/04 |
| 2019/0049981 A1 * | 2/2019 | Fischer ................ G05D 1/0088 |
| 2019/0248347 A1 * | 8/2019 | Kim .................. B60W 30/0956 |
| 2020/0057487 A1 * | 2/2020 | Sicconi .................... G06T 7/254 |
| 2020/0342760 A1 * | 10/2020 | Vassilovski ..... B60W 30/18163 |
| 2020/0353904 A1 * | 11/2020 | Lee .......................... B60T 7/22 |
| 2020/0389469 A1 * | 12/2020 | Litichever ............. H04L 63/029 |
| 2022/0234556 A1 * | 7/2022 | Yang ........................ B60T 7/22 |

\* cited by examiner

*Primary Examiner* — Hussein Elchanti
(74) *Attorney, Agent, or Firm* — Morgan, Lewis & Bockius LLP (57) ABSTRACT

The present disclosure relates to an apparatus for assisting driving of a host vehicle including: a camera mounted to the host vehicle and having a field of view outside of the host vehicle, the camera configured to obtain front image data; and a controller configured to process the front image data, obtain collision time with a surrounding vehicle and weather information based on the image data, and control a braking device provided in the vehicle to start braking at a first braking time point based on the collision time and weather information.

14 Claims, 10 Drawing Sheets

DRIVER ASSISTANCE APPARATUS AND DRIVER ASSISTANCE METHOD

CROSS-REFERENCE TO RELATED APPLICATION

This application is based on and claims priority under 35 U.S.C. § 119 to Korean Patent Application No. 10-2019-0172392, filed on Dec. 20, 2019 in the Korean Intellectual Property Office, the disclosure of which is incorporated herein by reference.

BACKGROUND

1. Technical Field

The present disclosure relates to a driver assistance apparatus and a driver assistance method. Specifically, the disclosed embodiment relates to a braking system for varying the braking time point of a vehicle based on weather information.

2. Description of the Related Art

A conventional Autonomous Emergency Braking (AEB) calculates a collision time between an own vehicle and another vehicle, and controls a braking device based on the calculated collision time.

However, the friction coefficient between the vehicle and the road surface varies according to the weather information or the road surface condition, and there is a problem that threatens the safety of the user by uniformly determining the braking time point even though the braking time point must be changed according to the variable friction coefficient.

SUMMARY

In order to solve the above problems, the disclosed embodiment provides a driver assistance apparatus, a driver assistance method, and a driver assistance system for varying the operation time of a braking device based on weather information.

In addition, it provides a driver assistance apparatus, a driver assistance method, and a driver assistance system that obtains weather information or friction coefficient information using Vehicle to Everything (V2X) communication and learns a braking situation by deep learning.

Therefore, it is an aspect of the present disclosure to provide an apparatus for assisting driving of a host vehicle including: a camera mounted to the host vehicle and having a field of view outside of the host vehicle, the camera configured to obtain front image data; and a controller including a processor configured to process the front image data, obtain collision time with a surrounding host vehicle and weather information based on the image data, and control a braking device provided in the host vehicle to start braking at a first braking time point based on the collision time and weather information.

The controller may be configured to start second braking at the second braking time point and start third braking at the third braking time point based on the weather information.

The controller may be configured to estimate the friction coefficient of the road based on the weather information.

The controller may be configured to determine whether a collision with the surrounding host vehicle may be avoided, and determine whether to control the braking device based on the determination result.

The controller may be configured to learn the road friction coefficient according to the weather information by deep learning.

The apparatus may further include: a storage configured to store the learning result, and the controller may be configured to determine the friction coefficient based on the learning result stored in the storage when it is determined that communication of the transceiver is impossible, and determine the first braking time point.

The controller may be configured to change the first braking time point when it is determined that the friction coefficient is less than a preset value.

It is another aspect of the present disclosure to provide a method for assisting driving of a host vehicle including: obtaining front image data by a camera mounted to the host vehicle and having a field of view outside of the host vehicle; and processing the front image data, and the processing include: obtaining collision time with a surrounding host vehicle and weather information based on the image data; and controlling a braking device provided in the host vehicle to start braking at a first braking time point based on the collision time and weather information.

The controlling may include: starting second braking at the second braking time point; and starting third braking at the third braking time point based on the weather information.

The controlling may include: estimating the friction coefficient of the road based on the weather information.

The controlling may include: determining whether a collision with the surrounding host vehicle may be avoided; and determining whether to control the braking device based on the determination result.

The controlling may include: learning the road friction coefficient according to the weather information by deep learning.

The method may further include: storing the learning result, and the controlling may include: determining the friction coefficient based on the learning result when it is determined that communication is impossible; and determining the first braking time point.

The controlling may include: changing the first braking time point when it is determined that the friction coefficient is less than a preset value.

It is another aspect of the present disclosure to provide a system for assisting driving of a host vehicle including: a camera mounted to the host vehicle and having a field of view outside of the host vehicle, the camera configured to obtain front image data; a transceiver configured to communicate with a host vehicle to Everything (V2X) communication base station; and a controller configured to process the front image data, obtain collision time with a surrounding host vehicle and weather information based on the communication result and the image data, and control a braking device provided in the host vehicle to start braking at a first braking time point based on the collision time and weather information.

The controller may be configured to start second braking at the second braking time point and start third braking at the third braking time point based on the weather information.

The controller may be configured to estimate the friction coefficient of the road based on the weather information.

The controller may be configured to determine whether a collision with the surrounding host vehicle may be avoided, and determine whether to control the braking device based on the determination result.

The system may further include: a storage configured to store the learning result of the braking situation; and the controller may be configured to learn the braking situation according to the weather information and the friction coefficient by deep learning, determine the friction coefficient based on the learning result stored in the storage when it is determined that communication of the transceiver is impossible, and determine the first braking time point.

The controller may be configured to change the first braking time point when it is determined that the friction coefficient is less than a preset value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as part", module", member", block", etc., may be implemented in software and/or hardware, and a plurality of parts", modules", members", or blocks" may be implemented in a single element, or a single part", module", member", or block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

Figure 1:
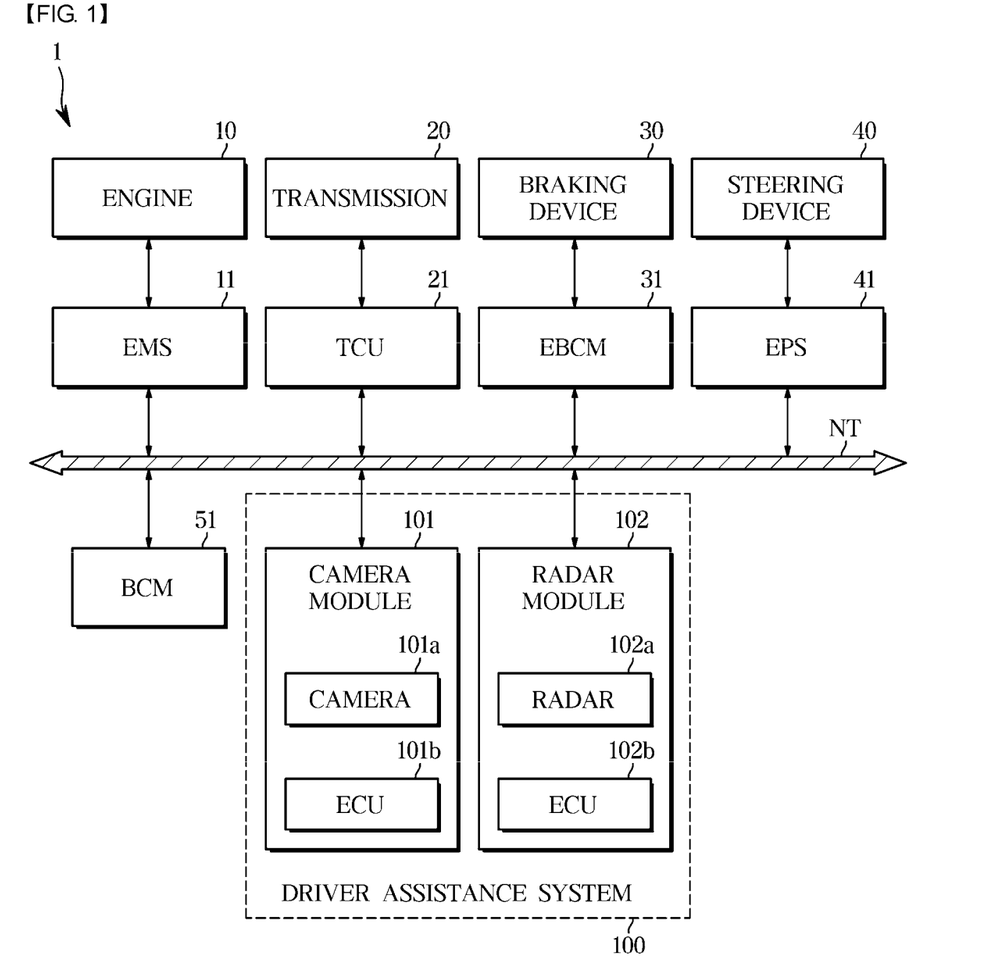
FIG. 1 is a block diagram illustrating a configuration of a vehicle according to an embodiment.

FIG. 1 is a block diagram illustrating a configuration of a vehicle according to an embodiment.

Referring to FIG. 1, a vehicle 1 includes an engine 10, a transmission 20, a braking device 30, and a steering device 40. The engine 10 may include a cylinder and a piston, and generate power required for the vehicle 1 to travel. The transmission 20 may include a plurality of gears, and transmit the power generated by the engine 10 to wheels. The braking device 30 may decelerate or stop the vehicle 1 through friction with the wheels. The steering device 40 may change the heading direction of the vehicle 1.

The vehicle 1 may include a plurality of machine parts. For example, the vehicle 1 may include an engine management system (EMS) 11, a transmission control unit (TCU) 21, an electronic brake control module (EBCM) 31, an electronic power steering (EPS) 41, a body control module (BCM) 51, and a driver assistance system (DAS) 100.

The EMS 11 may control the engine 10 in response to an acceleration intention of the driver through an accelerator pedal or a request of the DAS 100. For example, the EMS 11 may control the torque of the engine 10.

The TCU 21 may control the transmission 20 in response to a shift command of the driver through a shift lever and/or a travelling speed of the vehicle 1. For example, the TCU 21 may adjust the gear ratio of the engine 10 to the wheels.

The EBCM 31 may control the braking device 30 in response to a braking intention of the driver through a braking pedal and/or a slip of the wheels. For example, the EBCM 31 may temporarily release the braking of the wheels in response to a slip of the wheels sensed at a time of braking the vehicle 1 (anti-lock braking systems: ABS). The EBCM 31 may selectively release braking of the wheels in response to over-steering and/or under-steering sensed at a time of steering the vehicle 1 (electronic stability control: ESC). In addition, the EBCM 31 may temporarily brake the wheels in response to a slip of the wheels sensed at a time of driving the vehicle 1 (traction control system: TCS).

The EPS 41 may assist the operation of the steering device 40 in response to a steering intention of the driver through the steering wheel such that the driver may easily operate the steering wheel. For example, the EPS 41 may assist the operation of the steering device 40 such that the steering force is reduced during low-speed travelling or parking and the steering force is increased during high-speed travelling.

The BCM 51 may control the operation of machine parts that provide convenience to the driver or ensure the safety of the driver. For example, the BCM 51 may control a head lamp, a wiper, a cluster, a multifunction switch, a direction indicator lamp, and the like.

The driver assistance apparatus 100 or DAS may assist the driver in manipulating (driving, braking, and steering) the vehicle 1. For example, the DAS 100 may sense a surrounding environment of the vehicle 1 (e.g., another vehicle, a pedestrian, a cyclist, a lane, a road sign, and the like), and control driving and/or braking and/or steering of the vehicle 1 in response to the sensed environment.

The driver assistance apparatus 100 or DAS may provide the driver with various functions. For example, the DAS 100 may include a lane departure warning (LDW), a lane keeping assist (LKA), a high beam assist (HBA), an automatic emergency braking (AEB), a traffic sign recognition (TSR), a smart cruise control (SCC), a blind spot detection (BSD), and the like.

The driver assistance apparatus 100 or DAS includes a camera module 101 that obtains image data of the surrounding of the vehicle 1 and a radar module 102 that obtains object data of the surrounding of the vehicle 1. The camera module 101 may include a camera 101a and an electronic control unit (ECU) 101b, and photograph at least one of the front or the lateral side of the vehicle 1 and recognize another vehicle, a pedestrian, a cyclist, a lane, a road sign, and the like. The radar module 102 may include a radar 102a and an ECU 102b, and obtain a relative position, a relative velocity, and the like of an object of the surrounding of the vehicle 1 (e.g., another vehicle, a pedestrian, a cyclists, and the like).

The driver assistance apparatus 100 or DAS is not limited to the one shown in FIG. 1, and may further include a LiDAR that smays around the vehicle 1 and detects an object.

The above described electronic components may communicate with each other through vehicle communication network NT. For example, the machine parts may transmit data through Ethernet, media oriented systems transport (MOST), Flexray, controller area network (MAY), local interconnect network (LIN), and the like. For example, the DAS 100 may transmit a driving control signal, a braking signal, and a steering signal to the EMS 11, the EBCM 31, and the EPS 41, respectively.

Figure 2:
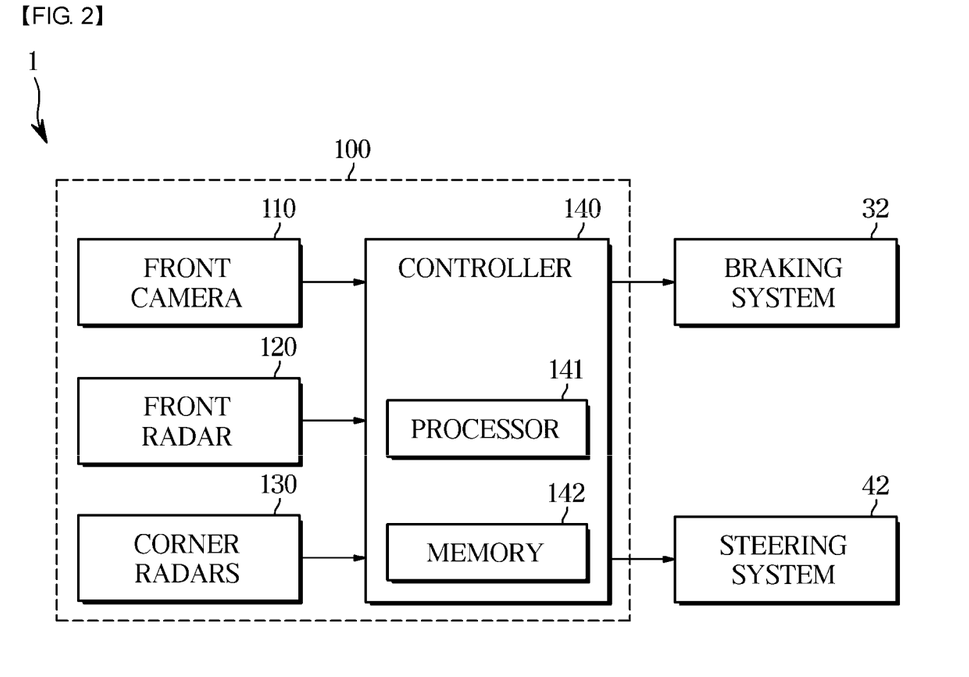
FIG. 2 is a block diagram illustrating a configuration of a driver assistance system according to an embodiment.
Figure 3:
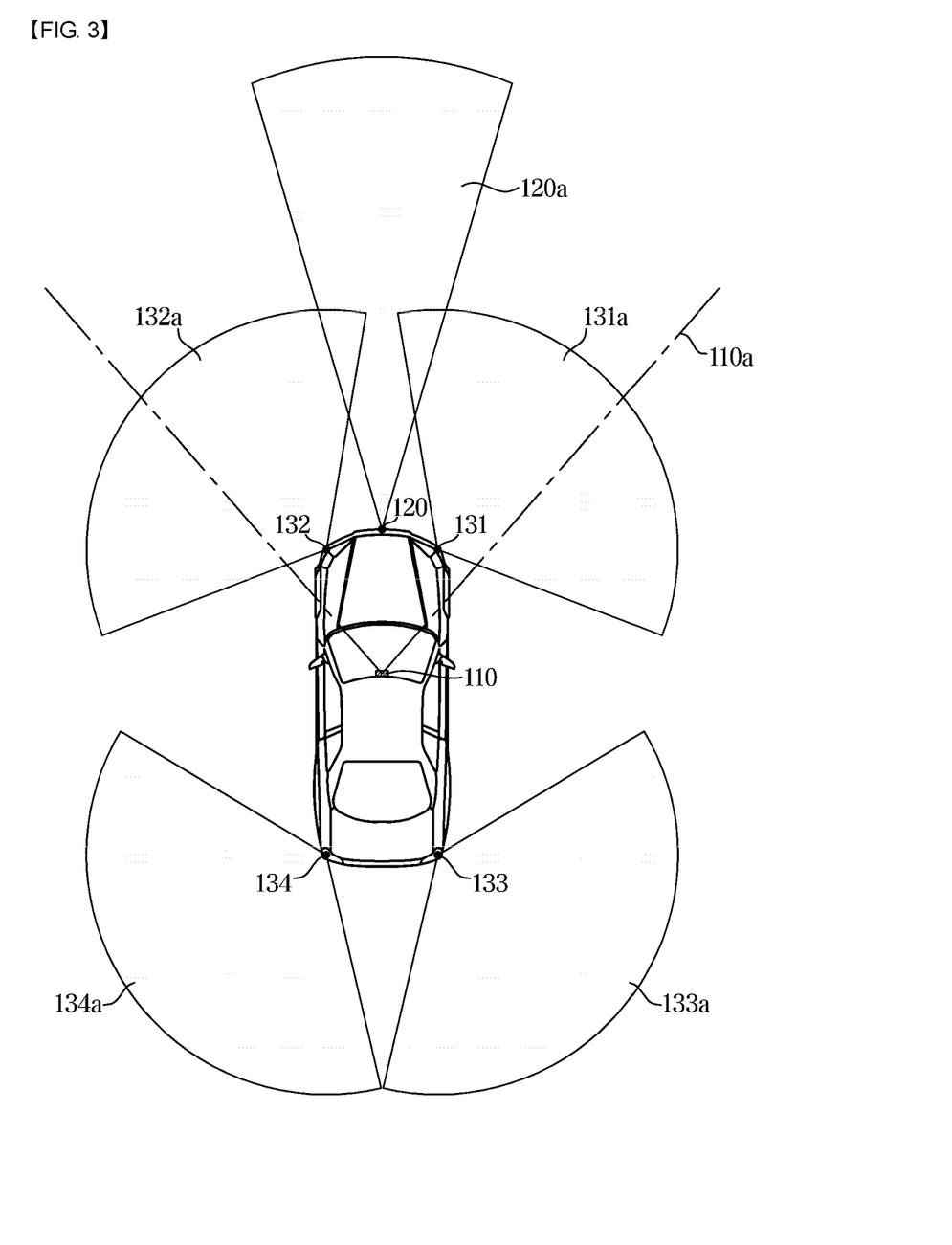
FIG. 3 is a diagram illustrating the operation of a camera and a radar included in a driver assistance system of a vehicle according to an embodiment.

FIG. 2 is a block diagram illustrating a configuration of a DAS according to an embodiment. FIG. 3 is a view illustrating a camera and a radar included in a DAS according to an embodiment.

Referring to FIG. 2, the vehicle 1 may include a braking system 32, a steering system 42, and a driver assistance apparatus 100 or DAS.

The braking system 32 includes the EBCM (31 in FIG. 1) and the braking device (30 in FIG. 1), which have been described with reference to FIG. 1, the steering system 42 includes the EPS (41 in FIG. 1) and the steering device (40 in FIG. 1).

The driver assistance apparatus 100 or DAS may include a front camera 110, a front radar 120, and a plurality of corner radars 130.

The front camera 110 may have a field of view 110a facing the front of the vehicle 1 as shown in FIG. 3. The front camera 110 may be installed, for example, on the front windshield of the vehicle 1.

The front camera 110 may photograph the front of the vehicle 1 and obtain image data of the front of the vehicle 1. The image data of the front of the vehicle 1 may include position information of another vehicle, a pedestrian, a cyclist, or a lane existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to the controller 140. For example, the front camera 110 may be connected to the controller 140 through a vehicle communication network NT, may be connected to the controller 140 through a hard wire, or may be connected to the controller 140 through a printed circuit board (PCB).

The front camera 110 may transmit image data in front of the vehicle 1 to the controller 140.

The front radar 120 may have a field of sensing 120a facing the front of the vehicle 1 as shown in FIG. 3. The front radar 120 may be installed, for example, on a grille or bumper of the vehicle 1.

The front radar 120 may include a transmission antenna (or a transmission antenna array) that radiates transmission radio waves forward of the vehicle 1 and a reception antenna (or a reception antenna array) that receives reflected radio waves reflected from an object. The front radar 120 may obtain front radar data from the transmission radio waves transmitted by the transmission antenna and the reflected radio waves received by the reception antenna. Front radar data may include distance information and velocity information regarding another vehicle, a pedestrian, or a cyclist existing in front of the vehicle 1. The front radar 120 may calculate the relative distance to the object on the basis of the phase difference (or time difference) between the transmission radio waves and the reflected radio waves, and calculate the relative velocity of the object on the basis of the frequency difference between the transmission radio waves and the reflected radio waves.

The front radar 120 may be connected to the controller 140 through a vehicle communication network NT, a hard wire, or a printed circuit board. The front radar 120 may transmit the front radar data to the controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed toward the front right side of the vehicle 1 as shown in FIG. 3. The first corner radar 131 may be installed on the right side of the front bumper of the vehicle 1, for example. The second corner radar 132 may have a field of sensing 132a directed toward the front left side of the vehicle 1, and may be installed on the left side of the front bumper of the vehicle 1, for example. The third corner radar 133 may have a field of sensing 133a directed toward the rear right side of the vehicle 1 and may be installed on the right side of the rear bumper of the vehicle 1, for example. The fourth corner radar 134 may have a field of sensing 134a directed toward the rear left side of the vehicle 1 and may be installed on the left side of the rear bumper of the vehicle 1, for example.

Each of the first, second, third and fourth corner radars 131, 132, 133, and 134 may include a transmission antenna and a reception antenna. The first, second, third, and fourth corner radars 131, 132, 133 and 134 obtain first corner radar data, second corner radar data, third corner radar data, and fourth corner radar data, respectively. The first corner radar data may include distance information and velocity information regarding another vehicle, a pedestrian, or a cyclist (hereinafter referred to as "an object") positioned on the front right side of the vehicle 1. The second corner radar data may include distance information and velocity information regarding an object positioned on the front left side of the vehicle 1. The third and fourth corner radar data may respectively include distance and velocity information regarding an object located on the rear right side of the vehicle 1 and distance and velocity information regarding an object located on the rear left side of the vehicle 1.

Each of the first, second, third, and fourth corner radars 131, 132, 133 and 134 may be connected to the controller 140 through a vehicle communication network NT, a hard wire, or a printed circuit board, for example. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU (101*b* in FIG. 1) of the camera module (101 in FIG. 1) and/or the ECU (102*b* in FIG. 1) of the radar module (102 in FIG. 1), and/or an integrated ECU.

The controller 140 includes a processor 141 and a memory 142.

The processor 141 may process the front image data of the front camera 110, the front radar data of the front radar 120 and the corner radar data of the plurality of corner radars 130, and generate a braking signal and a steering signal for controlling the braking system 32 and the steering system 42. For example, the processor 141 may include an image signal processor for processing front image data of the front camera 110 and/or a digital signal processor for processing radar data of the radars 120, 130 and/or a micro control unit (MCU) for generating a braking signal and a steering signal.

The processor 141 may sense objects (e.g., another vehicle, a pedestrian, a cyclist, and the like) front of the vehicle 1 on the basis of the front image data of the front camera 110 and the front radar data of the front radar 120.

In detail, the processor 141 may obtain position (distance and direction) and relative velocity of the objects in front of the vehicle 1 on the basis of the front radar data of the front radar 120. The processor 141 may obtain position (direction) and type information (for example, whether the object is another vehicle, a pedestrian, or a cyclist) of the object in front of the vehicle 1 on the basis of the front image data of the front camera 110. In addition, the processor 141 allows the object sensed by the front image data to match the object sensed by the front radar data, and obtains the type information, the position, and the relative velocity of the front objects of the vehicle 1 on the basis of a result of the matching.

The processor 141 may generate a braking signal and a steering signal on the basis of the type information, the position, and the relative velocity of the front objects.

For example, the processor 141 calculates a time to collision (TTC) between the vehicle 1 and the front object on the basis of the position (distance) and the relative velocity of the front object, and warns the driver of a collision or transmits a braking signal to the braking system 32 on the basis of a result of comparing the TTC with a predetermined reference time. In response to the TTC less than a predetermined first reference time, the processor 141 may allow an alert to be output via audio and/or display. In response to the TTC less than a predetermined second reference time, the processor 141 may transmit a preliminary-braking signal to the braking system 32. In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) on the basis of the relative speed of front objects, and warn the driver of a collision or transmit a braking signal to the braking system 32 on the basis of a result of comparing the DTC with distances to the front objects.

The processor 141 may obtain position (distance and direction) and relative velocity of the objects on the sides of the vehicle 1 (front right, front left, rear right, and rear left) on the basis of corner radar data of the plurality of corner radars 130.

The processor 141 may transmit a steering signal to the steering system 42 based on the position (distance and direction) and relative velocity of the objects on the sides of the vehicle 1.

For example, when a collision with a front object is determined based on the time to collision or the distance to the collision, the processor 141 may transmit a steering signal to the steering system 42 to avoid collision with the front object.

The processor 141 may determine whether to avoid a collision with a front object by changing the driving direction of the vehicle 1 based on the position (distance and direction) and relative velocity of the lateral objects of the vehicle 1. For example, when there is no object located on the side of the vehicle 1, the processor 141 may transmit a steering signal to the steering system 42 in order to avoid a collision with a front object. When the collision with the lateral object is not predicted after the steering of the vehicle 1 based on the position (distance and direction) and the relative velocity of the lateral objects, the processor 141 may transmit a steering signal to the steering system 42 in order to avoid a collision with a front object. When a collision with a lateral object is predicted after steering of the vehicle 1 based on the position (distance and direction) and relative velocity of the lateral objects, the processor 141 may not transmit the steering signal to the steering system 42.

The memory 142 stores programs and/or data for processing image data by the processor 141, programs and/or data for processing radar data by the processor 141, and programs and/or data for generating a braking signal and/or a steering signal by the processor 141.

The memory 142 may temporarily store the image data received from the front camera 110 and/or the radar data received from the radars 120 and 130, and may temporarily store a result of processing the image data and/or the radar data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like.

The driver assistance apparatus 100 or DAS is not limited to the one illustrated in FIG. 2, and may further include a LiDAR that smays around the vehicle 1 and detects an object.

As such, the controller 140 may transmit a braking signal to the braking system 32 on the basis of whether a collision with the front object is predicted to occur. When a side object is not present or a collision with a side object is not predicted to occur, the controller 140 may transmit a steering signal to the steering system 42 to avoid a collision with a front object. When a collision with a side object is predicted to occur after the steering, the controller 140 may not transmit the steering signal to the steering system 42.

Figure 4:
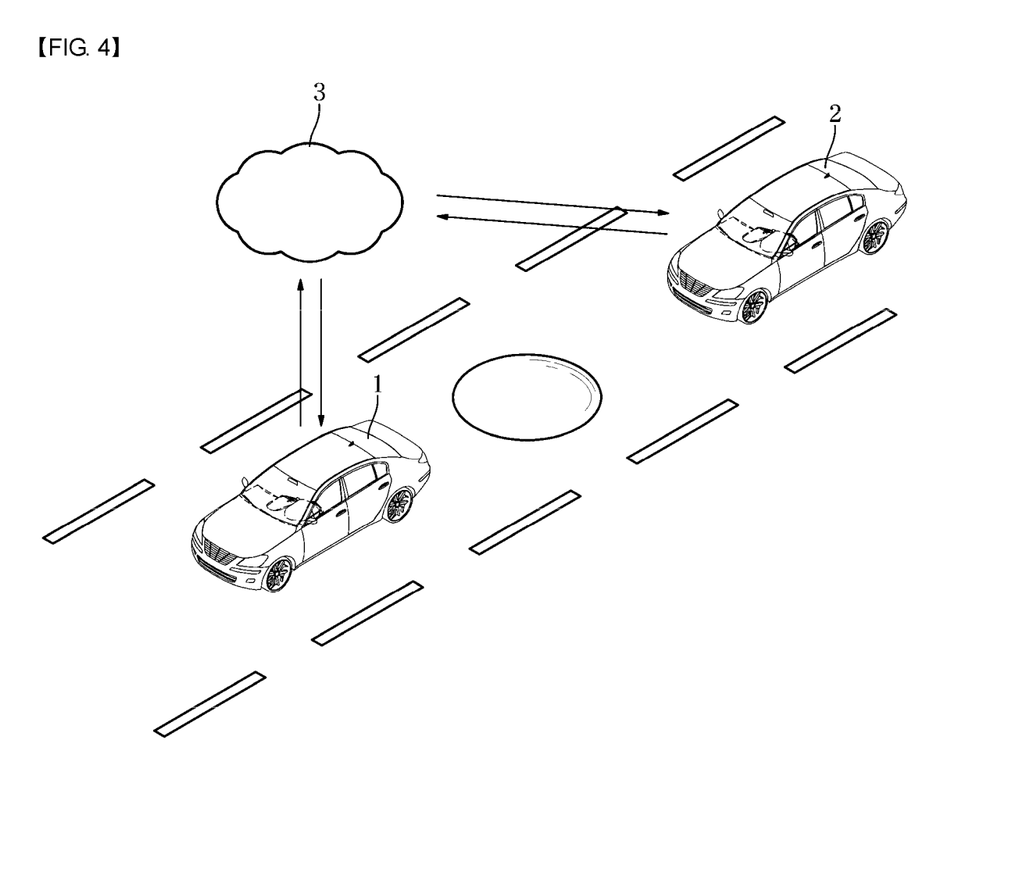
FIG. 4 is a diagram illustrating that the vehicle according to an embodiment performs V2X communication.

FIG. 4 is a diagram illustrating that the vehicle according to an embodiment performs V2X communication.

Referring to FIG. 4, the vehicle 1 may detect the front vehicle 2 and communicate with the V2X communication base station 3.

Here, the vehicle 1 transmits the location information of the current vehicle 1 to the V2X communication base station 3, the V2X communication base station 3 may determine the location information received from the vehicle 1 and transmit the weather information of the area where the vehicle 1 is located and the friction coefficient information of the road according to the weather information to the vehicle 1.

In addition, the V2X communication base station 3 may provide not only road friction coefficient information, but also various information for safe driving of the vehicle 1.

The V2X communication base station 3 may provide information related to driving of the vehicle 1 according to weather information and local weather information. For example, the V2X communication base station 3 provides a speed limit of the road corrected according to local weather information and weather information, or a maintenance distance with the front vehicle 2, or a critical acceleration, or a critical deceleration.

The V2X communication base station 3 may provide corrected parameters of each function of the driver assistance apparatus 100 according to local weather information and weather information. For example, the V2X communication base station 3 may provide a predetermined reference time for emergency braking (eg, reference TTC or reference DTC) or a predetermined reference time for emergency steering. Further, the V2X communication base station 3 may also provide a steering angle for emergency steering.

The V2X communication base station 3 may provide the vehicle 1 with information related to driving of the front vehicle 3. For example, the V2X communication base station 3 provides the vehicle 1 with information on the predicted time until the front vehicle 3 collides with the front vehicle of the front vehicle 3, and with information on emergency braking/emergency steering of the front vehicle 3.

Figure 5:
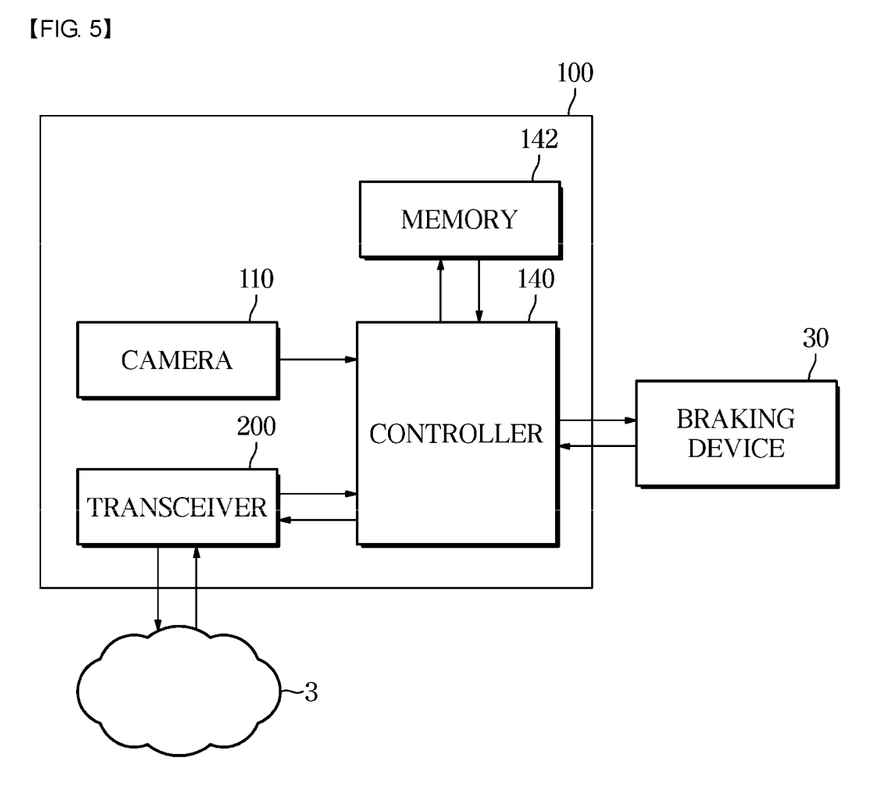
FIG. 5 is a control block diagram of a driver assistance apparatus according to an embodiment.

FIG. 5 is a control block diagram of a driver assistance apparatus according to an embodiment.

According to the disclosed embodiment, the driver assistance apparatus 100 includes a camera 110 and a controller 140, and may include a transceiver 200, a storage 142, and a braking device 30.

The camera 110 according to the disclosed embodiment may capture a front, side or rear image of the vehicle 1.

Specifically, the camera 110 has a front view of the vehicle 1 and obtains front image data. Here, the front image data may include location information, weather information, or road surface conditions of the vehicle 1, but is not limited thereto.

The transceiver 200 according to the disclosed embodiment may communicate with the V2X communication base station 3.

Specifically, as described above, the transceiver 200 basically transmits the location information of the vehicle 1 to the V2X communication base station 3, and receives the weather information of the area where the vehicle 1 is located from the V2X communication base station 3.

In addition, the transceiver 200 may exchange information about the current temperature from the V2X communication base station 3. Specifically, the vehicle 1 may further include a sensor that detects the outside temperature and the road surface temperature, the transceiver 200 may transmit the sensed temperature to the V2X communication base station 3, and may receive information on the possibility of black ice occurrence.

Black ice refers to a thin ice sheet created on a road by the process of melting water freezes again when the outside temperature drops and becomes ice.

The controller 140 according to the disclosed embodiment may calculate a Time to Collision (TTC) with a surrounding vehicle based on image data obtained by the camera 110. Also, the controller 140 may obtain weather information based on image data obtained by the camera 110.

In addition, the controller 140 may include the material of the road, the state of the pavement, or the presence of black ice based on the obtained image data.

The controller 140 may determine a first braking time point at which the braking device 30 starts braking based on the calculated collision time or weather information. In addition, the controller 140 may determine a second braking time point at which second braking starts or a third braking time point at which third braking starts based on the calculated collision time or weather information.

Here, the first braking time point may be, for example, a time point at which the time (TTC) until collision with the front vehicle 1 reaches a predetermined first reference time. In addition, the first braking time point may be a pre-fill braking time point. Pre-fill braking refers to a step in which the braking device 30 generates a constant braking pressure to shorten the braking speed of the user.

In addition, the second braking time point may be, for example, a time point at which the time (TTC) until collision with the front vehicle 1 reaches a second reference time that is smaller than the first predetermined reference time. In addition, the second braking time point may be a pre-braking time point. Here, the pre-braking may mean a step in which the vehicle 1 automatically brakes at a deceleration of 0.6 g or less, but is not limited thereto.

In addition, the third braking time point may be, for example, a time point at which the time (TTC) until collision with the front vehicle 1 reaches a third reference time that is smaller than the second predetermined reference time. In addition, the third braking time point may be a full-braking time point. Here, full braking means a braking step in which the maximum pressure is applied.

Also, the controller 140 may estimate the friction coefficient of the road based on weather information. Specifically, the controller 140 may determine weather information based on the obtained image data, estimate a friction coefficient through V2X communication, or estimate a current friction coefficient of the road based on previously learned friction coefficient information.

In addition, the controller 140 may determine whether a collision with the front vehicle 2 may be avoided in consideration of the friction coefficient information and the collision time, and determine whether to control the braking device 40. Specifically, when the friction coefficient exceeds the preset value and it is determined that the collision time is sufficient, the controller 140 may not advance the braking time point of the braking device 40. However, when the friction coefficient is less than the preset value and the collision time is determined to be a case where the collision between the vehicle 1 and the front vehicle 2 may not be avoided, the controller 140 may advance a first braking time point, a second braking time point, or a third braking time point of the braking device 40. In other words, the first reference time, the second reference time, and the third reference time compared with the time until collision with the front vehicle 1 (TTC) may increase. As the vehicle 1 approaches the front vehicle 1, the time until collision (TTC)

is shortened. At this time, since the first reference time, the second reference time, and the third reference time are increased, the controller 140 may perform emergency braking at a farther distance from the front vehicle 1. In other words, the time point of emergency braking is advanced.

Here, the degree of advancement of the first braking time point, the second braking time point, or the third braking time point may vary according to weather information or road friction coefficient information. In other words, the degree to which the first reference time, the second reference time, and the third reference time are decreased (time difference) may vary according to weather information or road friction coefficient information.

In addition, the driver assistance apparatus 100 according to the disclosed embodiment may store the braking situation learned by the controller 140 in the memory 142. A process in which the controller 140 learns the braking situation will be described in detail in FIG. 8.

In addition, the driver assistance apparatus 100 according to an embodiment disclosed as described above may include a memory 142 that stores a learning result of the controller 140, and may control a braking device 40 that adjusts the braking force of the vehicle 1.

Figure 6:
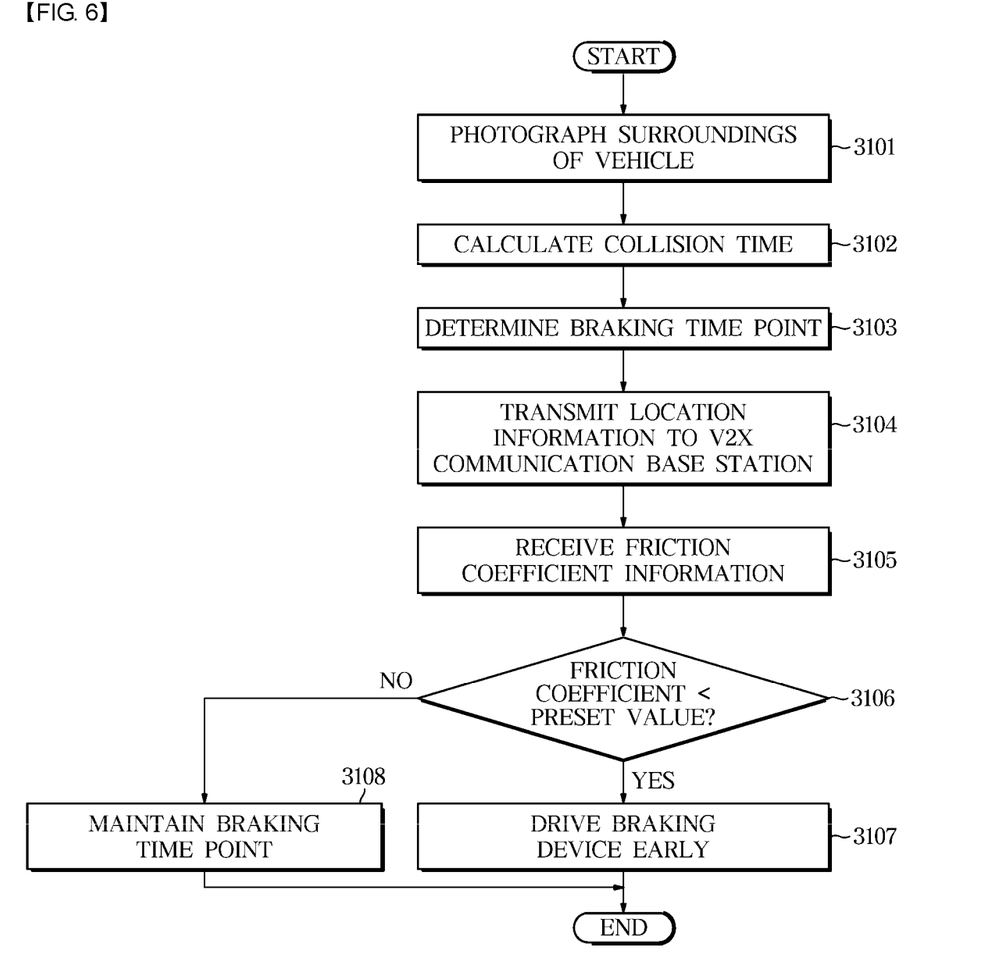
FIG. 6 is a flowchart illustrating a process of changing a braking point of a vehicle by a controller according to an embodiment.

FIG. 6 is a flowchart illustrating a process of changing a braking point of a vehicle by a controller according to an embodiment.

When the vehicle 1 starts to drive, the camera 110 photographs the surroundings of the vehicle 1 and obtains image data (3101).

The image data obtained here may include location information of the vehicle 1, weather information, or road surface conditions, but is not limited thereto. In addition, the image data may include an image of the surrounding vehicle 2.

When the camera 110 obtains image data, the controller 140 may calculate a collision time with a front vehicle or an object based on the obtained image data (3102).

Specifically, the obtained image data may include speed or direction information of a surrounding vehicle. The collision time calculated here may be a value considering weather information.

When the collision time is calculated, the controller 140 may determine the braking time point of the vehicle 1 (3103) and transmit location information of the vehicle 1 to the V2X communication base station 3 (3104).

Here, the location information may be the location of the vehicle 1 determined by the user terminal or a GPS sensor, or may be an image around the vehicle 1 captured by the camera 110.

When the location information is transmitted to the V2X communication base station 3, the V2X communication base station 3 transmits information related to the driving of the vehicle 1 including the friction coefficient of the place where the vehicle 1 is currently located to the vehicle 1, and the vehicle 1 receives it (3105).

For example, information related to driving of the vehicle 1 may include information on a friction coefficient of a currently located place.

In addition, the V2X communication base station 3 may provide not only road friction coefficient information, but also various information for safe driving of the vehicle 1. For example, the V2X communication base station 3 provides a speed limit of the road corrected according to local weather information and weather information, or a maintenance distance with the front vehicle 2, or a critical acceleration, or a critical deceleration. In addition, the V2X communication base station 3 may provide a predetermined reference time for emergency braking (eg, first reference time, second reference time, third reference time) or a predetermined reference time for emergency steering.

When information related to the driving of the vehicle 1 including the friction coefficient is received, the controller 140 compares the received friction coefficient with a preset value (3106). Here, the preset value may be a road friction coefficient set while the road surface is dry when the weather is clear, but is not limited thereto.

Specifically, when the received friction coefficient is less than the preset value, the controller 140 determines that a collision between the front vehicle 2 or the front object and the vehicle 1 is inevitable, and drives the braking device 2 early (3107). For example, in order to drive the braking device 2 early, the controller 140 may increase a first reference time, a second reference time, and a third reference time for emergency braking. In other words, the controller 140 may perform emergency braking at a greater distance from the front vehicle 1, and the time point at which the emergency braking is performed is advanced.

However, when the received friction coefficient is equal to or exceeds the preset value, the controller 140 determines that a collision between the front vehicle 2 or the front object and the vehicle 1 may be avoided, and maintains the braking time point of the vehicle 1 (3108).

Figure 7:
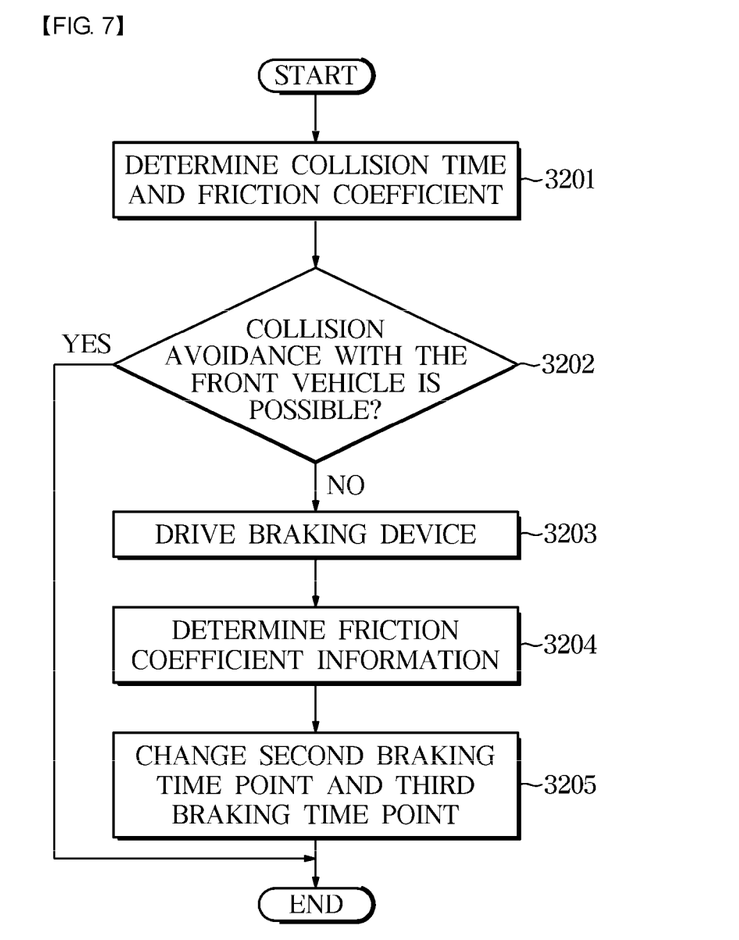
FIG. 7 is a flow chart illustrating a process of changing the second and third braking time points of the vehicle by the controller according to an embodiment.

FIG. 7 is a flow chart illustrating a process of changing the second and third braking time points of the vehicle by the controller according to an embodiment.

As described in FIG. 6, the controller 140 may calculate the collision time between the vehicle 1 and the front vehicle 2 or the front object, determine the friction coefficient where vehicle 1 is currently located (3201), determine the possibility of avoiding collision with the front vehicle 2 or the front object (3202).

When it is determined that a collision with the front vehicle 2 or a front object may be avoided, the controller 140 maintains the braking time point of the vehicle 1. However, when it is determined that collision with the front vehicle 2 or the front object is inevitable, the controller 140 forcibly drives the braking device 40 (3203).

Specifically, the controller 140 may advance the first braking time point than the calculated first braking time point when the friction coefficient is equal to the preset value. Here, the preset value may be a road friction coefficient set while the road surface is dry when the weather is clear, but is not limited thereto.

When the braking device 40 is driven, the controller 140 determines friction coefficient information (3204).

Specifically, the controller 140 may calculate a time required for the vehicle 1 to completely stop and a required braking force based on the determined friction coefficient.

When the friction coefficient information is determined, the controller 140 may change the second braking time point so that the second braking time point is changed, and may change the third braking time point so that the third braking time point is changed (3205).

As described above, the second braking time may be a time when free braking starts, and the third braking time may be a time when full braking starts.

Figure 8:
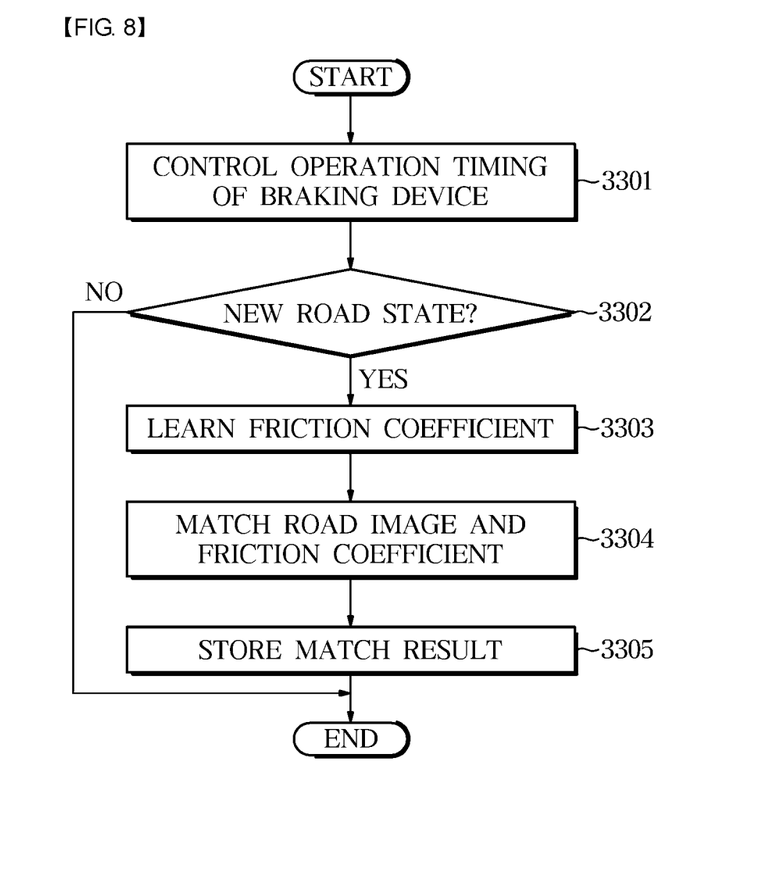
FIG. 8 is a diagram illustrating a process of deep learning a braking situation by a controller according to an embodiment.

FIG. 8 is a diagram illustrating a process of deep learning a braking situation by a controller according to an embodiment.

The controller 140 may control the operation timing of the braking device 40 based on weather information or friction coefficient information (3301).

When the operation point of the braking device 40 is changed, the controller 140 may determine whether the road state in which the vehicle 1 is located is a new road state that has never been driven (3302).

When it is determined as a new road state, the controller 140 learns the friction coefficient of the road on which the vehicle 1 is driving (3303).

Specifically, the controller 140 matches the friction coefficient of the road on which the vehicle 1 is driving with image data photographed by the camera 110 (3304), and stores the matched data in the memory 142 (3305).

However, when it is determined that it is not a new road state, the controller 140 ends the learning process.

Figure 9:
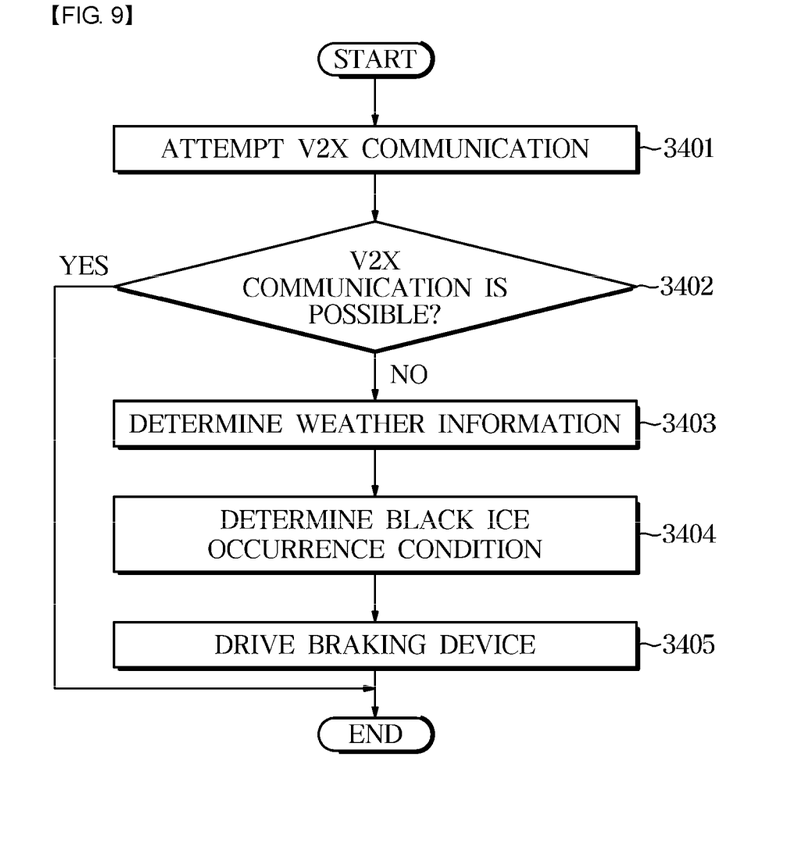
FIG. 9 is a flowchart illustrating a process of braking a vehicle in an area where V2X communication is not possible by the controller according to an embodiment.

FIG. 9 is a flowchart illustrating a process of braking a vehicle in an area where V2X communication is not possible by the controller according to an embodiment.

The controller 140 controls the transceiver 200 to attempt communication with the V2X communication base station 3 (3401).

The controller 140 attempts V2X communication and determines whether V2X communication is possible (3402).

Specifically, when it is determined that V2X communication is possible, the controller 140 does not utilize the information stored in the memory 142, and repeats the processes described in FIGS. 5 to 7.

However, when it is determined that V2X communication is impossible, the controller 140 determines weather information based on image data obtained by the camera 110 and detection data of a sensor provided in the vehicle 1 (3403).

Here, the weather information may include an outside temperature, an external weather condition, a photographed road condition, and the presence of black ice, but is not limited thereto.

When the weather information is determined, the controller 140 may determine whether the current road state is a black ice occurrence condition based on the determined weather information (3404).

Specifically, black ice refers to a thin film of ice that has melted snow or ice and then returned to a frozen state, and occurs when the temperature suddenly drops. Accordingly, when a change in the outside air temperature during driving occurs more than a preset temperature difference, the controller 140 may determine the black ice generation condition and set a reference value of the friction coefficient. For example, the controller 140 according to the disclosed embodiment may determine that it is a condition in which black ice may occur when the temperature changes from 0° C. to −10° C. while driving. However, the above-described temperature interval is only an exemplary embodiment, and the black ice occurrence condition may vary according to user definition, season, or weather conditions.

When the weather information is determined and the conditions of occurrence of black ice are determined, the controller 140 controls the braking time point of the braking device 40 and drives the braking device 40 (3405).

Figure 10:
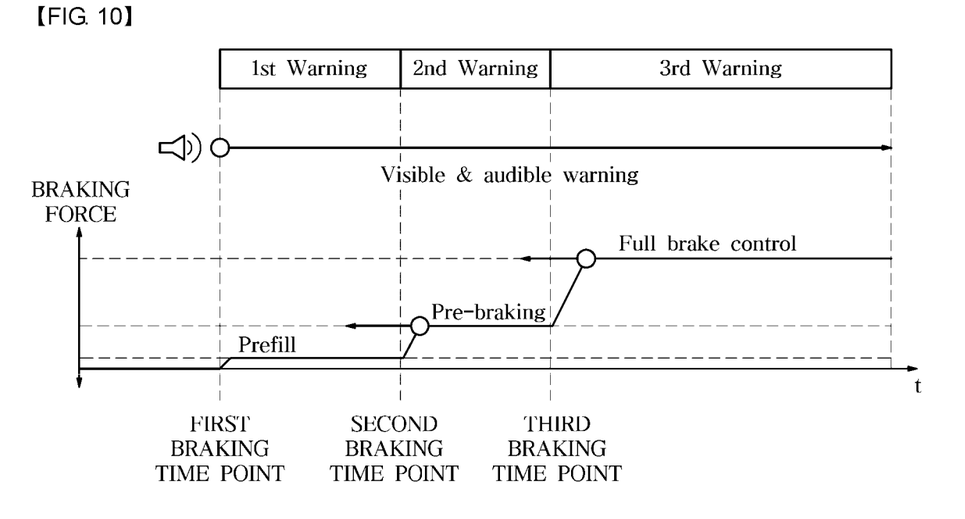
FIG. 10 is a graph illustrating an embodiment in which the controller according to an embodiment changes the braking point of the vehicle.

FIG. 10 is a graph illustrating an embodiment in which the controller according to an embodiment changes the braking point of the vehicle.

In the disclosed graph, the x-axis represents time and the y-axis represents braking force.

Referring to FIG. 10, a first braking time point may be a pre-fill braking time point, and a second braking time point may be a pre-braking time point. Here, the free braking may mean a step in which the vehicle 1 automatically brakes with a deceleration of 0.4 g or less, but is not limited thereto.

In addition, the third braking time point may be a full-braking time point. Here, full braking means a braking step in which the maximum pressure is applied.

In addition, the controller 140 may recognize a first braking time point as a first warning step, a second braking time point as a second warning step, and a third braking time point as a third warning step, and may control a plurality of devices provided in the vehicle 1 to warn the user.

For example, the controller 140 may control the audio device provided in the vehicle 1 so that a louder warning sound is generated from the first warning stage to the third warning stage. However, this is only an example, and other warning methods may be included.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that may be interpreted by a computer. For example, the computer-readable recording medium may be ROM, RAM, a magnetic tape, a magnetic disc, flash memory, an optical data storage device, etc.

According to an aspect of the disclosed invention, it is possible to provide a driver assistance apparatus, a driver assistance method, and a driver assistance system for varying the braking time of a vehicle based on weather information.

In addition, by providing the driver assistance apparatus, the driver assistance method, and the driver assistance system as described above, the disclosed embodiment has the effect of promoting the safety of the user and reducing accidents that occur during rain or snowfall.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An apparatus for assisting driving of a host vehicle, the apparatus comprising:
a camera mounted to the host vehicle and having a field of view outside of the host vehicle, the camera configured to obtain front image data; and
a controller configured to:
process the front image data, and
obtain collision time with a surrounding host vehicle and weather information based on the image data,
estimate a road friction coefficient based on the weather information,
determine whether a collision with surrounding host vehicle is avoidable by changing a driving direction of the host vehicle,
based determining that the collision with the surrounding host vehicle is unavoidable, control a braking device provided in the host vehicle to start braking at a first braking time point determined based on the collision time and the road friction coefficient.

2. The apparatus of claim 1, wherein the controller is configured to start second braking at a second braking time point and start third braking at a third braking time point based on the weather information.

3. The apparatus of claim 1, wherein the controller is configured to learn a road friction coefficient according to the weather information by deep learning.

4. The apparatus of claim 3, further comprising:
a storage configured to store a learning result of braking situation,
wherein the controller is configured to determine the road friction coefficient based on the learning result stored in the storage when it is determined that communication of a transceiver of the host vehicle to obtain the road friction coefficient from a base station is impossible, and determine the first braking time point based on the determined friction coefficient.

5. The apparatus of claim 4, wherein the controller is configured to change the first braking time point when it is determined that the road friction coefficient is less than a preset value.

6. A method for assisting driving of a host vehicle, the method comprising:
obtaining front image data by a camera mounted to the host vehicle and having a field of view outside of the host vehicle;
processing the front image data
estimating a road friction coefficient based on the weather information;
obtaining collision time with a surrounding host vehicle and weather information based on the processed image data;
determining whether a collision with surrounding host vehicle is avoidable by changing a driving direction of the host vehicle;
based determining that the collision with the surrounding host vehicle is unavoidable, controlling a braking device provided in the host vehicle to start braking at a first braking time point determined based on the collision time and the road friction coefficient.

7. The method of claim 6, wherein the controlling comprises:
starting third braking at a third braking time point based on the weather information.

8. The method of claim 6, wherein the controlling comprises:
learning a road friction coefficient according to the weather information by deep learning.

9. The method of claim 8, further comprising:
storing the learning result, and
wherein the controlling comprises:
determining the road friction coefficient based on the learning result when it is determined that communication to obtain the road friction coefficient from a base station is impossible; and
determining the first braking time point based on the determined road friction coefficient.

10. The method of claim 9, wherein the controlling comprises:
changing the first braking time point when it is determined that the road friction coefficient is less than a preset value.

11. A system for assisting driving of a host vehicle, the system comprising:
a camera mounted to the host vehicle and having a field of view outside of the host vehicle, the camera configured to obtain front image data;
a transceiver configured to communicate with a host vehicle to Everything (V2X) communication base station to receive, from the base station, information related to driving the host vehicle according to weather; and
a controller configured to:
process the front image data, and
obtain collision time with a surrounding host vehicle and weather information based on the information received from the base station and the image data, and
determining whether a collision with surrounding host vehicle is avoidable by changing a driving direction of the host vehicle;
based determining that the collision with the surrounding host vehicle is unavoidable, control a braking device provided in the host vehicle to start braking at a first braking time point determined based on the collision time and a road friction coefficient.

12. The system of claim 11, wherein the controller is configured to start second braking at a second braking time point and start third braking at a third braking time point based on the weather information.

13. The system of claim 11, further comprising:
a storage configured to store a learning result of braking situation; and
wherein the controller is configured to learn the braking situation according to the weather information and the road friction coefficient by deep learning, determine the road friction coefficient based on the learning result stored in the storage when it is determined that communication of the transceiver to receive, from the base station, the information related to driving the host vehicle according to weather is impossible, and determine the first braking time point based on the determined road friction coefficient.

14. The system of claim 13, wherein the controller is configured to change the first braking time point when it is determined that the road friction coefficient is less than a preset value.

* * * * *